United States Patent
Oliver

(10) Patent No.: US 9,969,364 B2
(45) Date of Patent: May 15, 2018

(54) TOUCHLESS VEHICLE WASH WITH CONVEYER SYSTEM

(71) Applicant: Ryan David Oliver, Surrey (CA)

(72) Inventor: Ryan David Oliver, Surrey (CA)

(*) Notice: Subject to any disclaimer, the term of this patent is extended or adjusted under 35 U.S.C. 154(b) by 363 days.

(21) Appl. No.: 14/671,177

(22) Filed: Mar. 27, 2015

(65) Prior Publication Data
US 2015/0273531 A1 Oct. 1, 2015

Related U.S. Application Data

(60) Provisional application No. 61/971,564, filed on Mar. 28, 2014.

(51) Int. Cl.
B08B 7/04 (2006.01)
B60S 3/04 (2006.01)
B60S 3/00 (2006.01)

(52) U.S. Cl.
CPC ............... B60S 3/04 (2013.01); B60S 3/004 (2013.01)

(58) Field of Classification Search
None
See application file for complete search history.

(56) References Cited

U.S. PATENT DOCUMENTS

| | | | |
|---|---|---|---|
| 4,576,098 A | 3/1986 | Belanger | |
| 4,981,523 A | 1/1991 | Larson | |
| 5,443,014 A | 8/1995 | Belanger | |
| 6,769,440 B2 | 8/2004 | Jones | |
| 7,677,258 B2 | 3/2010 | Hodge | |
| 8,443,818 B2 | 5/2013 | Belanger | |
| 8,448,653 B2 | 5/2013 | Turner | |
| 8,539,968 B2 | 9/2013 | Turner | |
| 8,550,098 B2 | 10/2013 | Belanger | |
| 2007/0246088 A1 | 10/2007 | Rennie | |
| 2013/0291909 A1 | 11/2013 | Belanger | |

OTHER PUBLICATIONS

Motor City Wash Works Web Site Main Page—Car Wash Equipment Co., http://www.motorcitywashworks.com/, Retrieved from Internet on Mar. 26, 2015, USA.
"The Motor City Wash Works Car Wash Catalog", vol. 4, www.motorcitywashworks.com/, USA, Copyright 2007-2014, retrieved from Internet on Mar. 26, 2015, USA.

Primary Examiner — Eric W Golightly
(74) Attorney, Agent, or Firm — Perry + Currier Inc.

(57) ABSTRACT

A touchless vehicle wash for washing a vehicle is provided comprising: a conveyor for contacting a wheel of the vehicle and propelling the vehicle through a wash tunnel; an structure, the structure including a first side vertical member, a vertically adjustable horizontal member in slidable engagement with the first side vertical member, an optional second side vertical member, an at least one vertical sensor for mapping an upper surface of the vehicle, an at least one horizontal sensor for mapping a front and a back of the vehicle, a first series of high pressure spray nozzles on the first side vertical member, fixedly positioned at a distance from the conveyor and a top series of high pressure spray nozzles adjustably positioned on the vertically adjustable horizontal member; an actuator for vertically adjusting the horizontal member; a second side sensor for sensing a second side; a positioner operatively connected to the sensor; and a second side vertical member connected to the actuator, the second side vertical member including a second series of high pressure spray nozzles, the first, top and second series of spray nozzles configured to be between about 12 inches to about 22 inches from the vehicle in use.

7 Claims, 8 Drawing Sheets

TOUCHLESS VEHICLE WASH WITH CONVEYER SYSTEM

CROSS REFERENCE TO RELATED APPLICATIONS

This application is related to, and claims the benefit of U.S. Provisional Patent Application No. 61/971,564, filed Mar. 28, 2014. The above-identified priority patent application is incorporated herein by reference in its entirety.

FIELD

The present technology is a touchless vehicle wash that combines the advantages of a friction wash with a touchless wash. More specifically, the technology is a touchless vehicle wash that can adjust the nozzles to the appropriate position for each vehicle in a series of vehicles as they are propelled through the wash by a conveyer.

BACKGROUND

The vehicle washing industry has gone through a number of changes over the past few decades, with the start of the automatic conveyor friction wash. These were easy and fast, but they gained a reputation for being rough on vehicles, sometimes to the point of ripping off mirrors, antennas and scratching paint.

To solve this, the touch free car wash was developed. This won popularity with customers over a very short time because it was safe, gentle on the vehicle and worked moderately well. With these systems a vehicle must park while a machine moves around it. The vehicle is then soaked with high and low pH cleaner and then cleaned with the high pressure water. Most touch-free car washes are "roll-over" systems. This means that a vehicle parks as a robotic piece of equipment moves back forth and around the parked vehicle. On average this type of wash can only clean 15 cars per hour. This, combined with high soap costs put pressure on the owners and, beginning to feel the pinch and they made up their losses by cutting back on the only variable cost; their soaps. Although the customers liked the idea of the touch free wash, it earned a reputation of being slow and often not cleaning well due to the costs cutting. This ultimately caused the decline of the touch free wash in the industry as a whole. As a result, the wash industry has been turning back to the friction conveyor wash. These do not require or use sensors to determine the width of the vehicle. This is partly because the washing apparatus is meant to contact the vehicle. Although the technology has improved there is still an inherent risk with an automated machine touching a vehicle to clean it. Even the best friction car wash technology will eventually damage a vehicle and likely miss spots while cleaning. Further, the brushes and fabrics wear out because of the friction and therefore must be replaced.

Examples of touchless car washes include U.S. Pat. Nos. 8,550,098 and 8,443,818 which disclose a carwash system wherein a spray arm dependingly mounted to an overhead longitudinally movable carriage for dispensing fluids onto the exterior surfaces of a vehicle in a wash bay unidirectionally circumnavigates the vehicle for multiple circuits while performing one or more wash functions by coordinating longitudinal and rotational movements of the arm through the selective operation of two independent motor drives. Electrical power and/or data is carried to and from electrical devices on the arm by way of a slip ring conductor which is mounted coaxially with the arm pivot on the bottom side of the carriage. The fluid supply conduit also passes concentrically through this pivot. In both this patent and in U.S. Pat. No. 8,539,968 the vehicle remains stationary as the spray arm circles it. Sensors determine the front and back of the vehicle, but do not accurately map the shape of the car, hence the sprayers can only be positioned accurately with regard the front and back of the vehicle. As noted above, in addition to this deficiency, the quality of the wash is inferior. Further, as there are a limited number of sensors, there is the potential for damaging the vehicle by contact being made with the rotating arms.

U.S. Pat. No. 8,448,653 discloses a car wash system comprising at least one rotatable spray arm depending from an overhead carriage. The arm is equipped with a detent-type compound breakaway knuckle which permits the arm to be displaced upwardly from a lowest potential energy orientation by disengaging the detent but thereafter permitting a smooth essentially unresisted movement whereby when the force tending to cause angular displacement and the arm is removed, the arm returns to the normal operating, low potential energy position. A shaker function or a high pressure spray burst may be used to complement the gravitational resetting function as needed. The spray arm is provided with a breakaway knuckle to reduce damaged to vehicles, however, it must contact the vehicle and be met with resistance in order to function. As noted above, in addition to this deficiency, the quality of the wash is inferior.

U.S. Pat. No. 6,769,440 discloses a vehicle loading system for the wash bay of an automatic vehicle wash system that eliminates the use of a floor-mounted target to capture the front tire of the vehicle to be washed. The vehicle wash system includes a pair of side position sensors that detect and create a side profile of the vehicle as the vehicle enters into the wash bay. The vehicle wash system includes a front sensor array that includes a plurality of through-beam sensors that detect the front bumper of a vehicle and signal the vehicle operator to stop when the front bumper is in the correct position. An overhead sensor contained on the overhead gantry detects the top profile of the vehicle positioned within the open wash bay. A control unit receives the information from the variety of sensors and operates the overhead gantry based upon the detected parameters of the vehicle. An overhead spray arm is rotatably mounted on the gantry. This system is simply for locating the vehicle correctly on the loading system.

US Publication No. 20130291909 discloses a shape-changing spray arch for a "touchless" spray washer for automotive vehicles and the like. A transit frame which can change shape is mounted in a fixed arch frame and connected to an actuator which changes the shape of the side and top spray conduits in a reciprocal fashion as vehicles pass through the arch. In addition, the spray conduits, both side and top conduits, can be twisted or reoriented around their respective longitudinal axes to be aimed more toward an approaching vehicle and then reoriented to be aimed more toward a receding vehicle, the change in angular orientation being effected as the vehicle passes through the arch. These features can be used separately or in combination. As noted above, the quality of the wash is inferior.

US Publication No. 20070246088 discloses an improved exterior rollover vehicle washing machine and/or cleaning system including an external frame, a gantry having no internal propulsion, a motor, a drive line/pulley system, at least two washer arm assemblies, a water supply line and a chemical supply line. In one embodiment, the motor has belt and pulley members to move the gantry back and forth along a frame track. The washer arms can move horizontally alongside the vehicle from vehicle front to vehicle back, as well as horizontally toward and away from the vehicle. The washer arms can further be pivotally mounted to the gantry so as to move within a 90 degree range such that the water supply line and/or chemical supply line can rotate from approximately 45 degrees to one side of the normal line directed at the vehicle to 45 degrees on the other side of the normal line directed at the vehicle. This system touches the vehicle and is therefore undesirable.

Wheel washing assemblies are also provided for car washes. U.S. Pat. No. 7,677,258 discloses a wheel washing assembly that contains a machine frame, a pendulum assembly pivotably supported on the machine frame, and two washing manifolds, including a first washing manifold and a second washing manifold, attached to the pendulum assembly. Each of the washing manifolds has a nozzle assembly for ejecting water at a wheel to be washed. The washing manifolds are pivotable between a start washing position and an end washing position by an automatic motion of the pendulum assembly. The washing manifolds further automatically track the wheels to be washes by a motion of one of the wheels.

As noted above, the earlier car washes included a conveyer system for moving the vehicle through the washing assembly. Some of these can be as long as 120 feet or more. Examples of the conveyers used to transport the vehicle include U.S. Pat. No. 4,576,098. It discloses a guided track that extends along the floor surface and a conveyor mechanism that is oriented in an elongated trench below the floor immediately under the guided track. On demand, a dolly will rise out of an opening at the entrance end of the conveyor for engaging the tire of a vehicle which has been properly staged in the conveyor. The dolly will gradually advance the vehicle along the conveyor until the vehicle exits and the dolly drops below floor level to begin its said return flight. It should be noted that dollies have two alternative paths on the drive flight, one path below floor level where the dolly is totally out of the way and an alternative path above floor level within the guided track for engaging the vehicle tire. Dollies can be spaced sufficiently close together so as to enable a series of automobiles being translated along the conveyor to be positioned relatively close apart to achieve maximum vehicle through put. Below the floor conveyors are widely used in North America and function quite satisfactorily, however, they are expensive to install due to the required concrete work necessary to embed the conveyor below the floor surface.

For this reason, the same inventor, in U.S. Pat. No. 5,443,014 discloses an above the floor conveyor for transporting a wheeled vehicle having a plurality of tires across a floor surface with a pair of the vehicle's tires oriented in a guided track. The conveyor includes a drive and idle sprocket which are spaced apart and have an endless tensile member extending in a loop thereabout to define a drive and a return flight. A series of dolly assemblies are attached to the endless conveyor tensile member in spaced apart orientation. The dolly assemblies have an elongated dolly roller for engaging a tire of a vehicle located within the guided track. The dollies are pivotable about a generally vertical dolly axis between an inactive position in which the dolly roller is pivoted rearwardly out of the guided tracks and an active position in which a dolly roller extends inwardly into the guided track. The dolly assembly has an arm extending outwardly from the pivot axis providing a follower spaced from the axis. A dolly guide rail is fixed parallel to the drive flight for cooperating with the dolly follower to support the dolly when in the active position. An actuator is provided to selectively shift the dolly between the inactive and active positions on demand.

U.S. Pat. No. 4,981,523 discloses a fluid distribution apparatus is provided which includes a sensor for developing control signals representative of the profile of a vehicle to be cleaned and a tube for distributing fluid. The tube is movable horizontally in directions parallel to the path of a vehicle being cleaned and vertically toward and away from the path of the vehicle. Movements of the tube are controlled to position the tube in front of the vehicle and move the tube in the direction of movement of the vehicle and to position the tube above the vehicle and move the tube in a direction opposite that of the vehicle and simultaneously move the tube vertically to follow the profile of the vehicle. The tube is also positioned behind the vehicle and moved in the direction of the vehicle after the profiling. Oscillatory movement of the tube about a plurality of angular positions is also provided. The vehicle is propelled through the car wash on a conveyer.

What is needed is a touchless vehicle wash system that can accurately map the dimensions of the vehicle, then using that information, adjust the cleaning apparatus as the vehicle moves along the car wash. This would preferable position the cleaner a suitable distance from essentially all exterior parts of the car, which in turn would ensure that the vehicle is cleaned. This would preferably occur as a potential stream of vehicles are rapidly propelled through the cleaning apparatus. It would be of even greater advantage if the number of moving parts was minimized. It would be a greater advantage if the system functioned as an assembly line as this would permit continued operation of the wash. It would allow loading more than one vehicle at a time, thereby greatly increasing the number of vehicles that can be processed in a given time.

Yet another advantage would be sprayers specifically designed to clean the bumpers.

SUMMARY

The present technology provides a touchless vehicle wash system that provides accurate wash measurement and adjustments for each vehicle in a potential stream of vehicles as the vehicles are propelled through the cleaning apparatus. This provides powerful and efficient cleaning for all vehicle sizes and shapes. The front, back, sides and upper surfaces are cleaned. As the vehicle is propelled through the cleaning apparatus, the vehicle is rapidly cleaned and the system is available for the next vehicle in as little as one minute. The number of moving parts is minimized by having one side of the cleaning arch permanently mounted and eliminating the need for multiple moving brushes or clothes to effectively clean the vehicle. The propelling means is a conveyer. The system functions as an assembly line, permitting continued operation of the wash allowing loading more than one vehicle at a time, thereby greatly increasing the number of vehicles that can be processed in a given time. As the washing is very efficient, the washing system need only be about 60 feet long, not including the loading area.

The touchless vehicle wash system optionally includes a tire conditioner which automatically applies an Amoral® type of product to vehicle tires at the end of the wash.

In one embodiment, a touchless vehicle wash for washing a vehicle is provided comprising a first side vertical member; a vertically adjustable horizontal member in slidable engagement with the first side vertical member; a conveyor extending along a substrate under the horizontal member for propelling a vehicle through the vehicle wash; sensors for mapping an upper surface, a front and a back of a vehicle; a first series of high pressure spray nozzles on the first side vertical member, positioned at a distance from the conveyor; a top series of high pressure spray nozzles adjustably positioned on the vertically adjustable horizontal member; an actuator for vertically adjusting the horizontal member; a second side sensor for sensing a second side; a positioner operatively connected to the sensor; a second side vertical member connected to the positioner; a second series of high pressure spray nozzles on the second side vertical member; and a processor in electronic communication with the sensors and the actuator such that in use, the touchless vehicle wash is configured to locate the first, top and second series of spray nozzles to be between about 12 inches to about 22 inches from a vehicle.

In the touchless vehicle wash, the second side sensor and the positioner may be an integrated adjustor and the integrated adjustor may comprise a bumper pivotally attached to an at least one articulating arm, the articulating arm pivotally attached to a floor mount.

In the touchless vehicle wash, the integrated adjustor may further comprise an actuator, the actuator extending between the bumper and the floor mount.

In the touchless vehicle wash, the first series of nozzles may be 16 inches from an outer edge of the conveyor.

In the touchless vehicle wash, the bumper may move at least 10 inches from a retracted position to an extended position, to position the second series of nozzles about 16 inches from a second side of a vehicle, in use.

In the touchless vehicle wash, the actuator may be a pneumatic or electronic actuator in communication with an electronic sensor, the pneumatic actuator to retain the integrated adjustor in a retracted position at least until a vehicle enters the wash tunnel.

The touchless vehicle wash may further comprise a series of vehicle bumper washer nozzles.

The touchless vehicle wash may further comprise a tire conditioner.

In the touchless vehicle wash, the integrated adjustor may further comprise a biasing member, biasing the bumper towards the conveyor.

In the touchless vehicle wash, the second side sensor may be an electronic sensor.

In another embodiment, a method of cleaning a vehicle is provided, the method comprising propelling the vehicle through the touchless vehicle wash described above.

In another embodiment, a method of cleaning a vehicle is provided, the method comprising: sensors sensing a height, a width, and a length of the vehicle in relation to a conveyor; the conveyor propelling the vehicle through a touchless vehicle wash and positioning the vehicle such that a first side is between about 12 inches to about 22 inches from a first side series of high pressure nozzles; a horizontal member slidably adjusting to the height and the contour of the vehicle to position a top series of high pressure nozzles between about 12 inches to about 24 inches vertical distance from the vehicle; a positioner adjusting a second side series of high pressure nozzles to between about 12 inches to about 22 inches from a second side; and washing the vehicle.

In the method, wherein the first side series of high pressure nozzles, the top series of high pressure nozzles and the second side series of high pressure nozzles may be maintained at about 16 inches to about 18 inches from the vehicle.

In the method, the second side of the vehicle may be sensed with a bumper, the bumper moving between a retracted position and an extended position in response to a second side wheel.

The method may further comprise washing a bumper of the vehicle with a bumper series of high pressure nozzles In the method, the vehicle may be washed in under about 5 minutes.

In the method, the vehicle may be washed in under about 3 minutes.

In the method, a plurality of vehicles may be propelled in a series through the touchless vehicle wash on the conveyor and are washed.

In another embodiment, a touchless vehicle wash for washing a vehicle is provided comprising: a conveyor for propelling a vehicle through the vehicle wash; a vertically adjustable horizontal member; a first and a second vertical member, wherein at least one of the first and the second vertical members are horizontally adjustable; the horizontal member and the vertical members defining an inner space; a plurality of nozzles mounted on the members and in liquid communication with a liquid source; a plurality of sensors directed to the inner space; a second side sensor coupled to a vertical member positioner, the vertical member positioner mechanically connected to the vertical member; a horizontal member actuator mechanically connected to the horizontal member; and a processor in electronic communication with the sensors and the horizontal member actuator to control vertical movement of the horizontal member.

In the touchless vehicle wash the second side sensor and the vertical member positioner may include a bumper pivotally attached to an at least one articulating arm, the articulating arm pivotally attached to a floor mount.

In the touchless vehicle wash the second side sensor may be an electronic sensor in communication with the processor, the processor in electronic communication with the vertical member positioner.

FIGURES

DESCRIPTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about"

applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, The terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
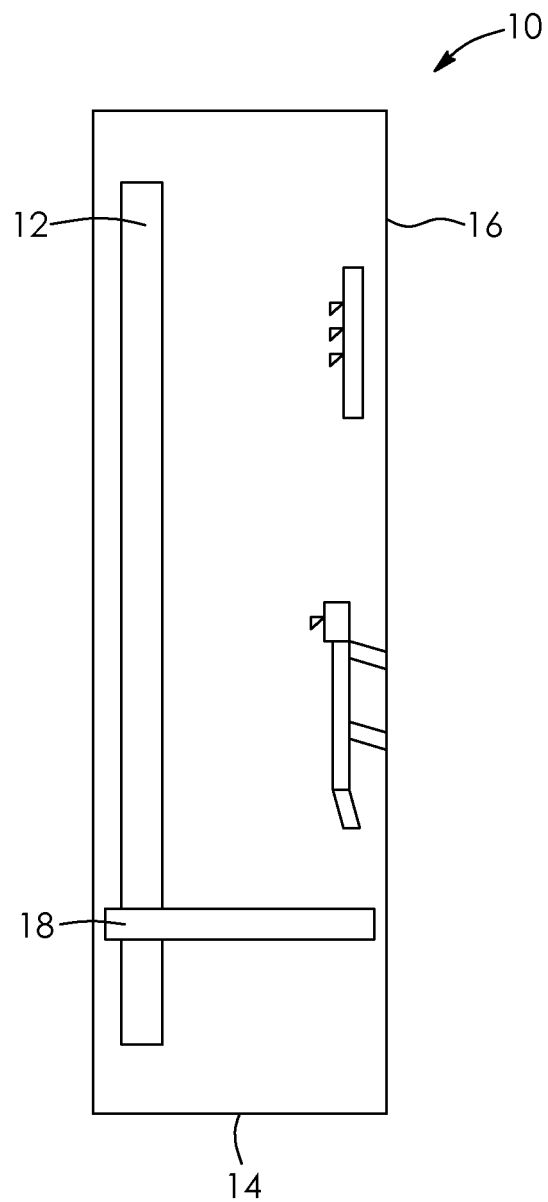
FIG. 1 is a top view of the vehicle washing system of the present technology.
Figure 2:
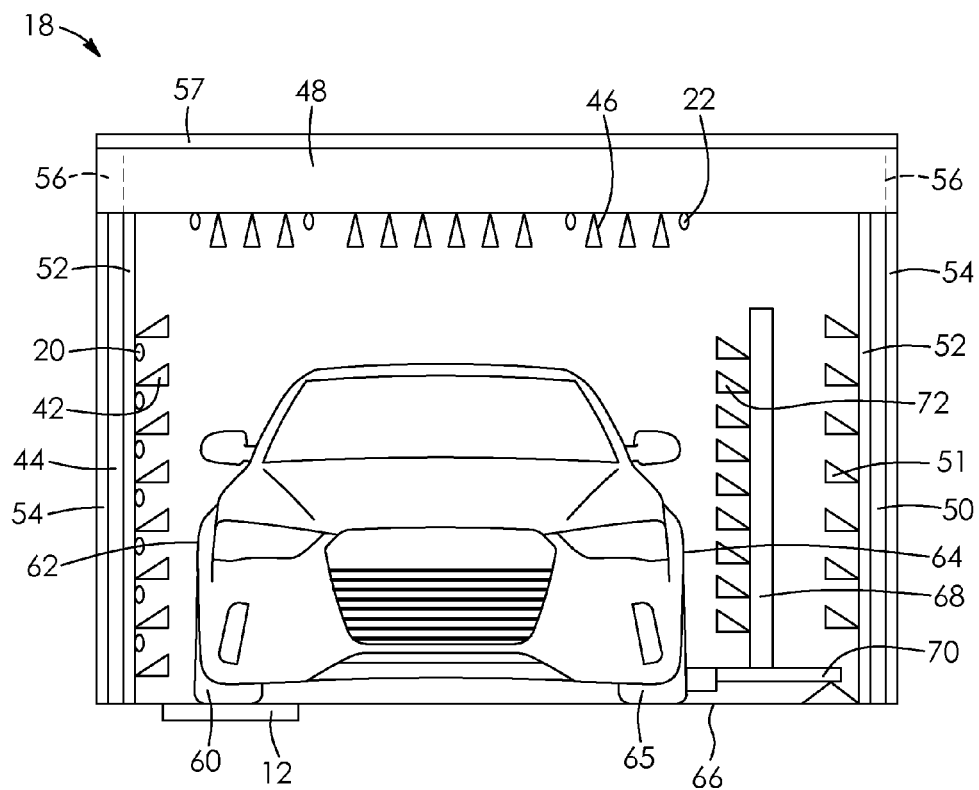
FIG. 2 is a cross sectional view of the technology of FIG. 1.
Figure 3:
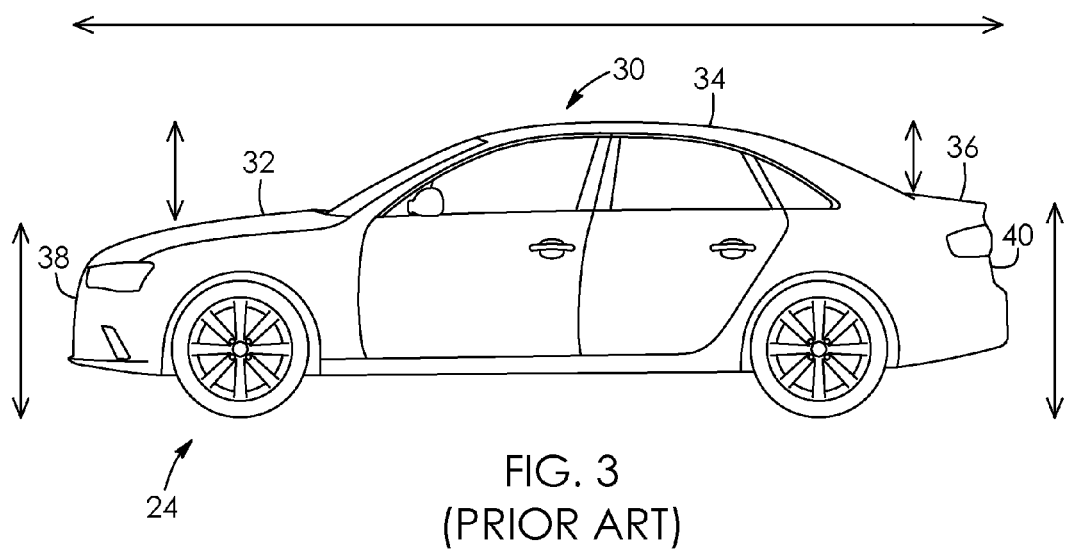
FIG. 3 is a longitudinal view of a vehicle of the prior art.
Figure 4:
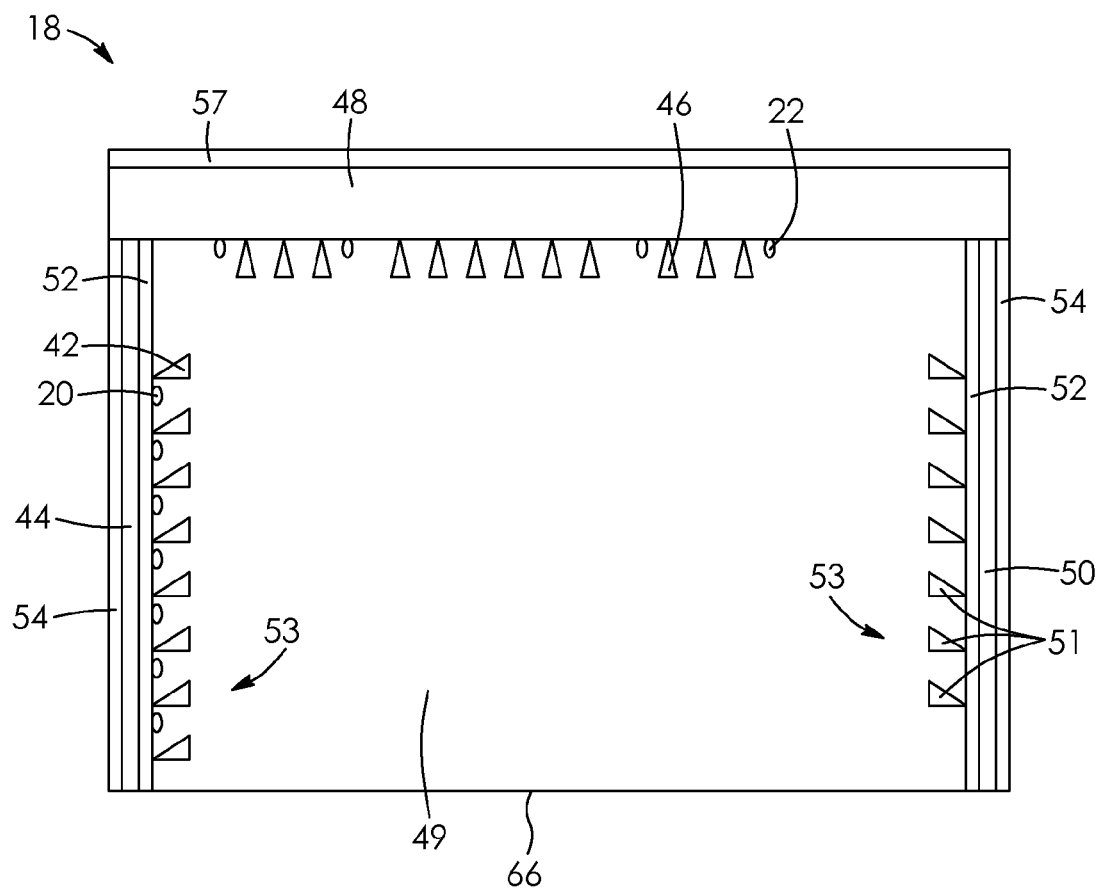
FIG. 4 is a simplified view of FIG. 2.

The touchless vehicle wash, generally referred to as 10 is shown in FIG. 1. The vehicle wash is about 60 feet long with a conveyer 12 extending substantially the length of the wash tunnel 16 in which it is housed. As shown in FIGS. 1 and 2, a robotic structure 18 is mounted adjacent the conveyer 12 close to the front end 14 of the wash tunnel 16. The robotic structure 18 in the preferred embodiment is a Motor City Wash Works® that has been modified for the present technology. As shown in FIG. 2, it has a series of vertical sensors 20 and a series of horizontal sensors 22. A vehicle, generally referred to as 24, is shown in FIG. 3. The vertical sensors 20 measure and profile the upper surfaces of the vehicle, generally referred to as 30, including the hood 32, roof 34, and trunk, roof racks or utility box or the like 36. The horizontal sensors 22 measure and profile the front 38 and back 40 of the vehicle. The robotic structure 18 adjusts automatically to the upper profile of the vehicle and the front and back of the vehicle. Note that this allows one to wash their car without having to remove racks or boxes or the like from the roof—one could mistakenly take a vehicle with a canoe, kayak or bike on the roof through the wash and not have them harmed. Returning to FIG. 2, the robotic structure, generally referred to as 18, is provided with a first series of nozzles 42 on a first side vertical member 44 and a top series of nozzles 46 on the horizontal member 48. As shown in FIG. 4, the nozzles 42, 46 are directed towards the vehicle 24 in an inner space 49. They are in fluid communication with a source of washer fluid, rinser fluid and wax. The first side vertical member 44 is fixed. The optional vertical member 50 may also have an optional series of nozzles 51. A lower section 53 of the first series of nozzles 42 and the optional series of nozzles 51 is located between about 12 inches to about 22 inches, preferably about 16 inches to about 20 inches or about 18 inches, and all distances therebetween from the wheels and extend from a substrate which may be a floor 66 to about 24" from the floor 66 for spraying wheels 60, 65 and the lower part of the vehicle 64 (see FIG. 2 for the wheels and sides of the vehicle). The horizontal member 48 is slidably engaged in slides 52 on the first 44 and optionally on the optional vertical member 50 and moves up and down under the control of actuators 54, which are preferably a combination of pneumatic, electronic and gear-driven. Pivots 57 and their associated pivot actuators 56 allow the angle of horizontal member 48 to change thereby allowing the spray direction to be modified in response to the shape of the front 38, back 40 and upper surfaces 30 of the vehicle 24. The horizontal member 48 is positioned in use to be about 12 inches to about 22 inches, preferably about 16 inches to about 20 inches or about 18 inches, and all distances therebetween from the upper surfaces 30, front 34 and back 38 of the vehicle 24.

The wheels 60 of the first side 62 of the vehicle 24 are on the conveyer 12. This locates the first side 62 of the vehicle 24 an appropriate distance from the nozzles 42 (see FIG. 2 for vehicle sides and wheels). The appropriate distance is between about 12 inches to about 22 inches, preferably about 16 inches to about 20 inches or about 18 inches, and all distances therebetween. The second side wheels 65 of the vehicle 24 on the second side 64 are not on the conveyer 12 and simply roll along the floor 66.

Figure 5:
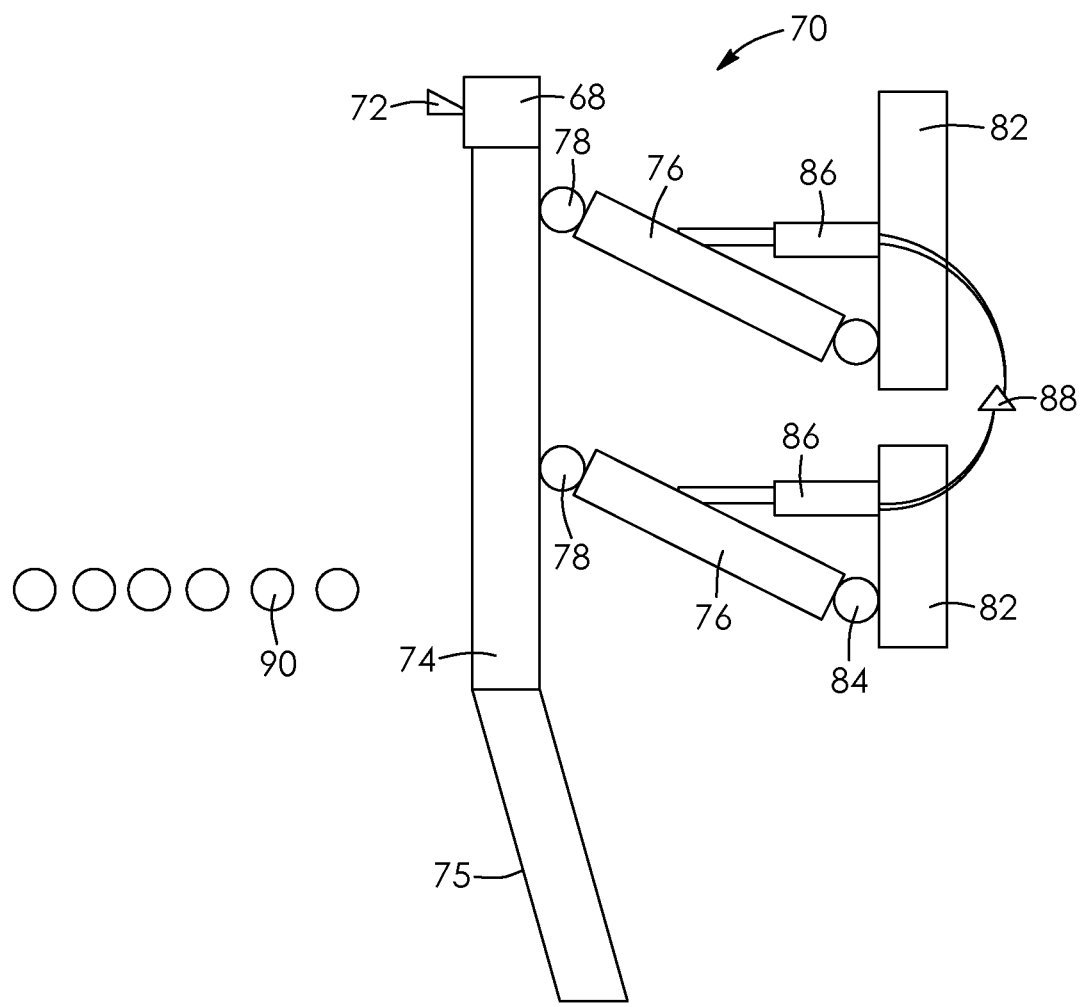
FIG. 5 is a plan view of the adjustor of the present technology.

The width of vehicles is highly variable, hence, in order to meet the requirement of the nozzles being within 18 inches of the side 62, 64 of the vehicle 24, a second vertical member 68 is mounted on an adjustor 70 that provides a distance of about 12 inches to about 22 inches, preferably about 16 inches to about 20 inches or about 18 inches, and all distances therebetween from the second side 64 of the vehicle 24 to a second series of nozzles 72 mounted on the second vertical member 68. The mechanism is shown in FIG. 5. The adjustor 70 has a sensor 74 that is preferably a bumper 74 that is pivotally mounted on a positioner 76 that is preferably at least two articulating arms 76 with a hinge or pivot 78. The bumper 74 can move at least about 10 inches, preferably 12 inches or 15 inches between a retracted position and an extended position. The bumper 74 has a leading edge 75 that is angled away from the conveyer 12. The bumper 74 physically senses the position of the second side wheel 65 (see FIG. 2). The articulating arms 76 are pivotally attached to floor mounts 82, with pivots or hinges 84. A pneumatic ram 86 extends between the floor mounts 82 and the articulating arm 76. An air valve 88 is in gaseous communication with the pneumatic ram 86. The adjustor 70 therefore is preferably an integrated sensor-actuator. Also seen in FIG. 5 are floor mounted vehicle bumper cleaners 90.

Figure 6:
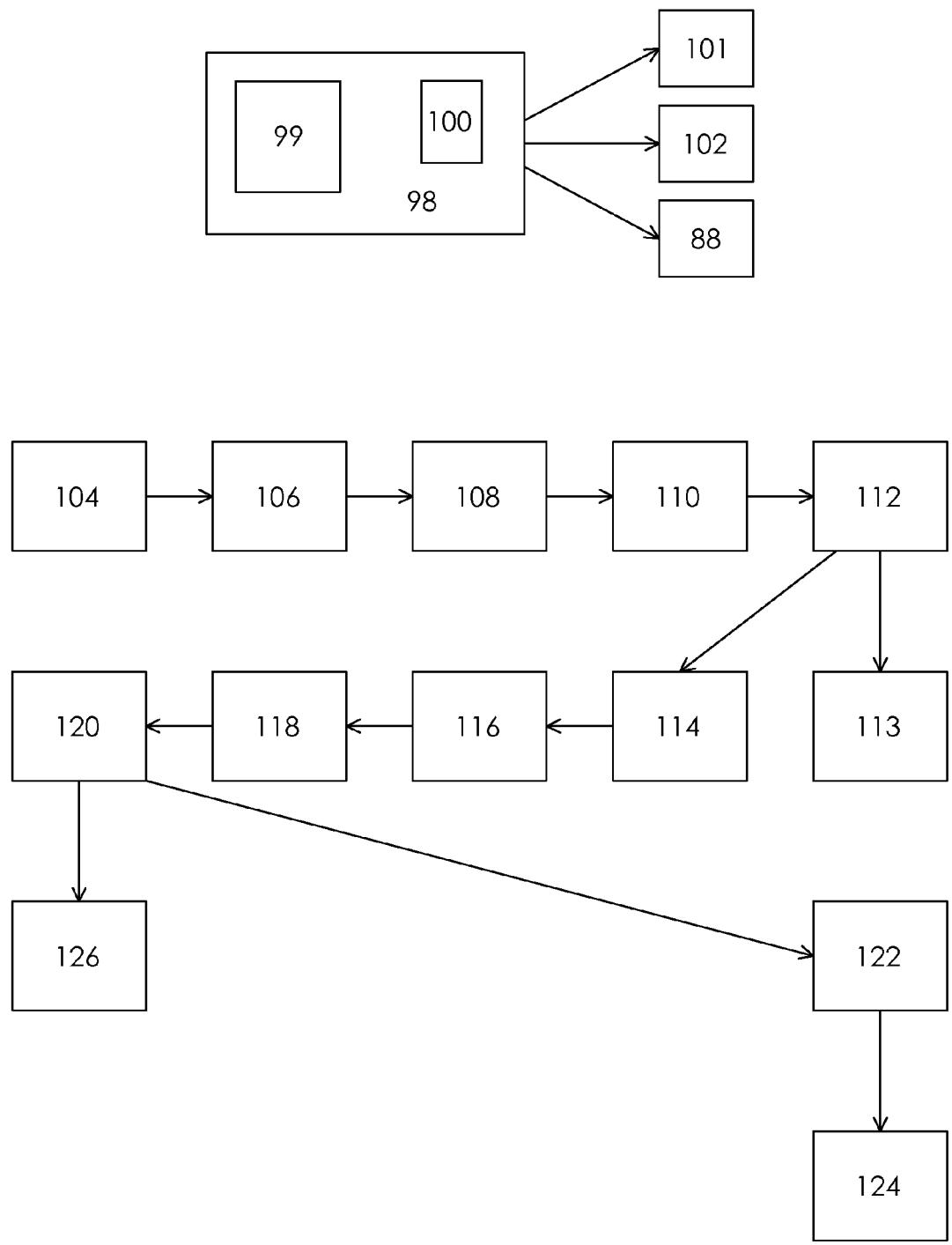
FIG. 6 is a block diagram of the operation of the present technology.

As shown in FIG. 6, the vehicle wash is under control of a computer 98 that has a memory 99 for instructing a processor 100 to interpret sensor data and send instructions to a water valve 101, a soap dispenser 102 and the air valve 88, in addition to the other components of the vehicle wash. Before a vehicle enters the tunnel, the adjustor 70 is in the retracted position 104. The vehicle enters 106 the tunnel. The electronic sensors sense 108 the upper surfaces 30, front 38 and back 40 of the vehicle 24. The processor 100 under instructions from the memory 99 interprets 110 the sensor signals and instructs 112 the pneumatic ram 86 of the adjustor 70 to extend 113 the adjustor 70 outward toward the second side wheel 65. The processor 100 similarly instructs 114 the pneumatic ram 54 of the horizontal member 48 to urge 116 the horizontal member 48 up or down and pivot 118 the top series of high pressure nozzles 46 to match the contour of the vehicle 24. When the electronic sensors sense 120 that the vehicle has passed through the tunnel, the pneumatic ram is instructed 122 to retract the adjustor 70 and the adjustor 70 is retracted 124. Similarly, the horizontal member 48 is returned 126 to a starting position.

Figure 7:
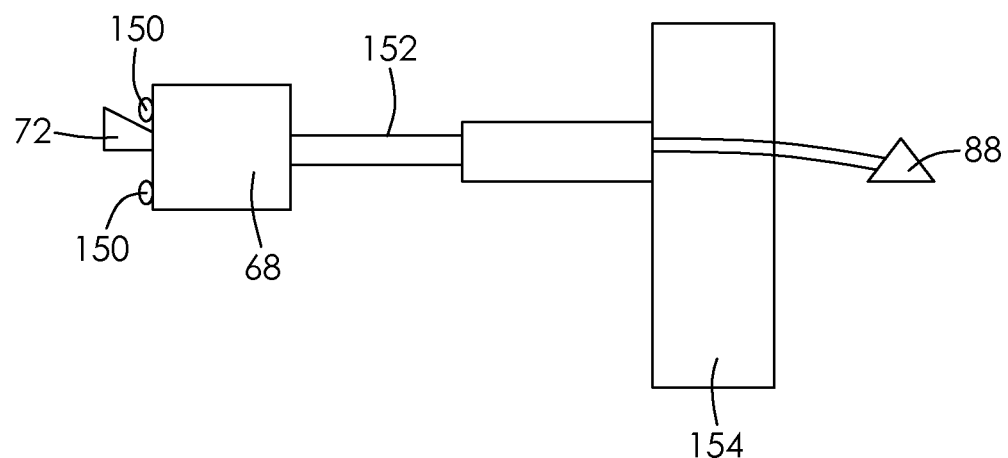
FIG. 7 is a plan view of an alternative embodiment of the present technology.

In an alternative embodiment shown in FIG. 7, an electronic sensor is used to sense the width of the vehicle. The sensor 150 is positioned to measure the second side 64 of the vehicle 24 and is either on an actuator 152 or is in communication with the actuator 152. The sensor 150 visually or electronically senses the position of the second side 64. The sensor is, for example, but not limited to an infrared or an optical sensor. The second vertical member 68 with its series of nozzles 72 is mounted on the actuator 152. The actuator 152 may be a pneumatic ram, a hydraulic ram, an articulating arm controlled by a pneumatic ram (as shown in the Figure) or hydraulic ram, a worm drive or any other suitable actuator as would be known to one skilled in the art, including an electronic actuator. The actuator 152 is attached to a floor mount 154. Once the sensor 150 senses the width of the vehicle, the actuator is positioned such that the nozzles 72 are about 12 inches to about 22 inches, preferably about 16 inches to about 20 inches or about 18 inches, and all distances therebetween from the side of the vehicle.

Figure 8:
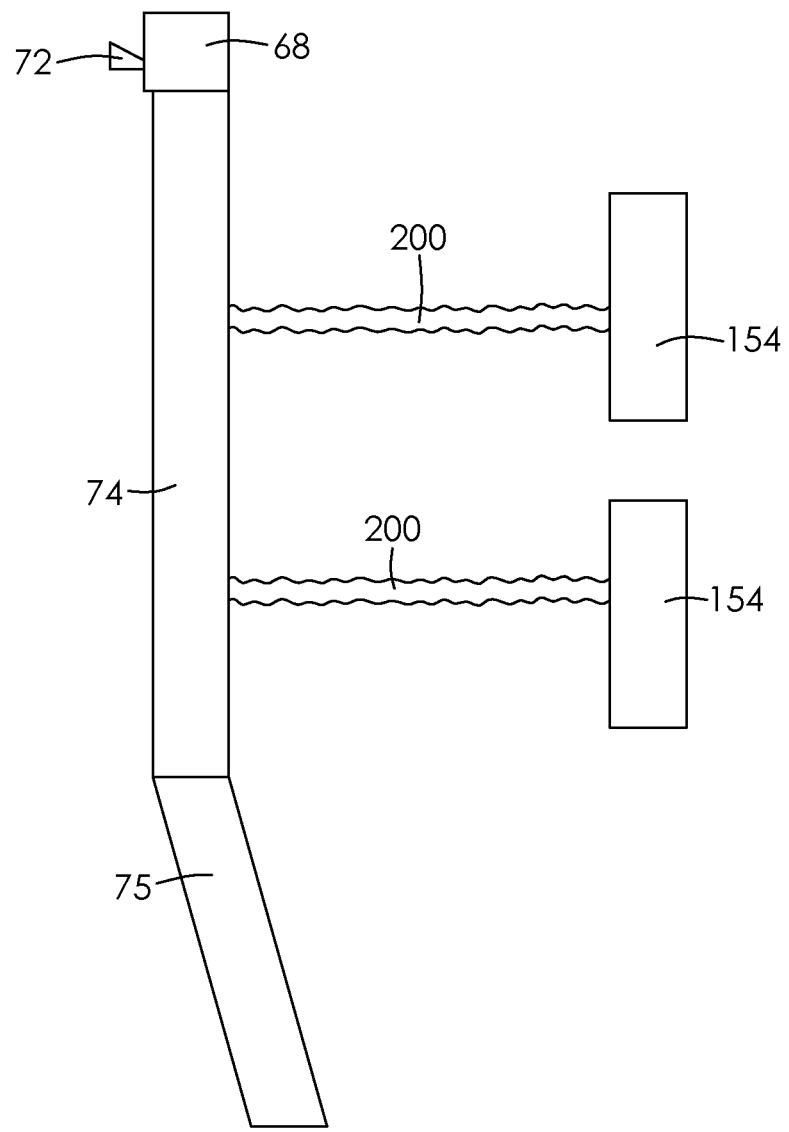
FIG. 8 is a plan view of yet another embodiment of the present technology.

In another alternative embodiment shown in FIG. 8, the pneumatic ram of the adjustor of FIG. 5 is replaced with a biasing member 200. The biasing member 200 is attached to the bumper 74 and floor mounts 154. In this embodiment, pressure exerted by the wheel mechanically positions the adjustor and therefore the position of the second series of high pressure nozzles.

Figure 9:
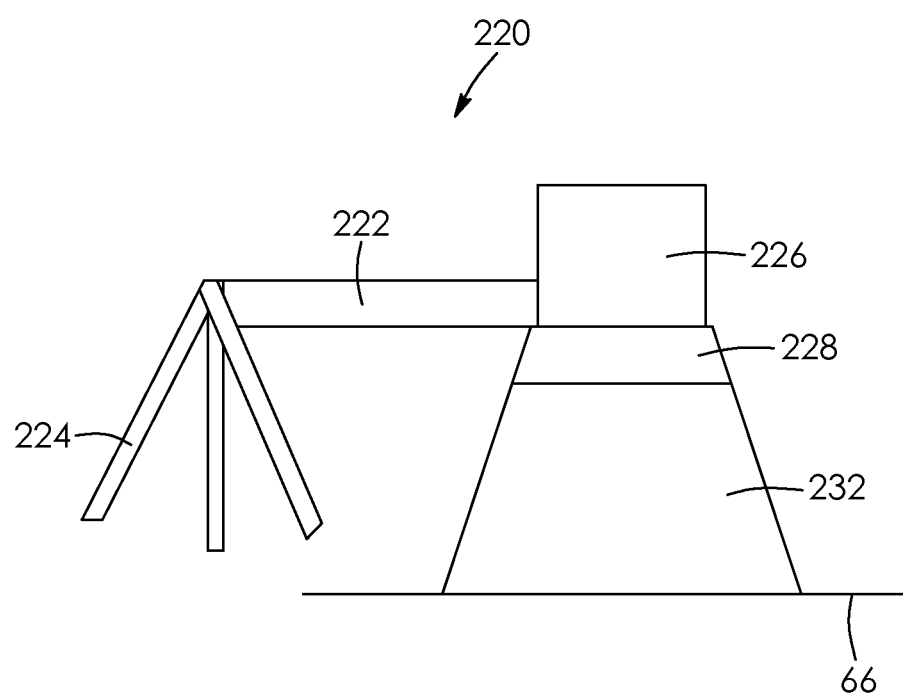
FIG. 9 is a cross sectional view of the tire washer of the present technology.

FIG. 9 shows a tire washer, generally referred to as 220. The tire washer 220 has a spindle 222 with cloth strapping 224 extending therefrom. The spindle 222 is rotationally driven by a motor 226 that is set at an appropriate height and distance from the vehicle by being mounted on a member 228 that is attached to the floor 66 with a floor mount 232.

A tire conditioner may also be in the vehicle wash. Spray nozzles are affixed to a guide and are positioned to spray conditioner on the wheels.

Example 1

While the distances between the various components can be adjusted, in the preferred embodiment the following distances are maintained:

First vertical member to outside edge of conveyor on the first side: 21";
First series of nozzles to outside edge of conveyor on first side: 16";
Distance from inside edge of conveyer to adjustor bumper when retracted: 73";
Total distance bumper can move: 15";
Width of bumper on adjustor: 2";
Length of bumper on adjustor: 15 feet; and
Height from the floor to the top of the bumper: 5".

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. For example, other imaging techniques may be used, resulting in other images being analysed. Such equivalents are intended to be encompassed in the scope of the claims, if appended hereto or subsequently filed. As would be known to one skilled in the art, the relationship between the conveyor and first and second sides may be reversed, as can the components associated with the first and second side.

I claim:

1. A touchless vehicle washer for washing a vehicle comprising: a first side vertical member; a horizontally adjustable second side vertical member; a vertically adjustable horizontal member in moveable engagement with at least one of the side vertical members, the horizontal member and the vertical members defining an inner space; a conveyor along a substrate extending a length of the washer; a plurality of sensors mounted on the washer and directed to the inner space; a plurality of nozzles mounted on the members and directed to the inner space, the plurality of nozzles comprising a first series of nozzles mounted on the first side vertical member, a second series of nozzles mounted on the second side vertical member, and a top series of nozzles mounted on the horizontal member, the nozzles in liquid communication with a liquid source; a horizontal member actuator mechanically connected to the horizontal member, the horizontal member actuator comprising a pivot actuator and pivot mount for locating the horizontal member; an integrated adjustor, which is mechanically connected to the second side vertical member and comprises a second side sensor which is a bumper pivotally attached to at least one articulating arm, which is pivotally attached to a floor mount; and a processor in electronic communication with the plurality of sensors and the horizontal member actuator.

2. The touchless vehicle washer of claim 1 wherein the integrated adjustor further comprises an actuator, the actuator extending between the bumper and the floor mount.

3. The touchless vehicle washer of claim 2, wherein the integrated adjustor further comprises a biasing member, biasing the bumper towards the conveyor.

4. The touchless vehicle washer of claim 3, wherein the bumper is configured to move at least about 10 inches from a retracted position to an extended position.

5. The touchless vehicle washer of claim 4, wherein the first series of nozzles is about 16 inches from an outer edge of the conveyor.

6. The touchless vehicle washer of claim 1 further comprising a series of floor-mounted bumper washer nozzles.

7. A touchless vehicle washer for washing a vehicle comprising: a first side vertical member; a horizontally adjustable second side vertical member; a vertically adjustable horizontal member in moveable engagement with at least one of the side vertical members, the horizontal member and the vertical members defining an inner space; a conveyor along a substrate extending a length of the washer; a plurality of sensors mounted on the washer and directed to the inner space; a plurality of nozzles mounted on the members and directed to the inner space, the nozzles in liquid communication with a liquid source; a horizontal member actuator mechanically connected to the horizontal member; a positioner attached to the substrate and mechanically connected to the second side vertical member; a second side sensor coupled to the positioner, the positioner and the second side sensor for positioning the second side vertical member horizontally in and out of the inner space; and a processor in electronic communication with the plurality of sensors and the horizontal member actuator.

* * * * *